(No Model.)
S. A. PICKETT.
RICE SCOURER.
No. 482,192. Patented Sept. 6, 1892.
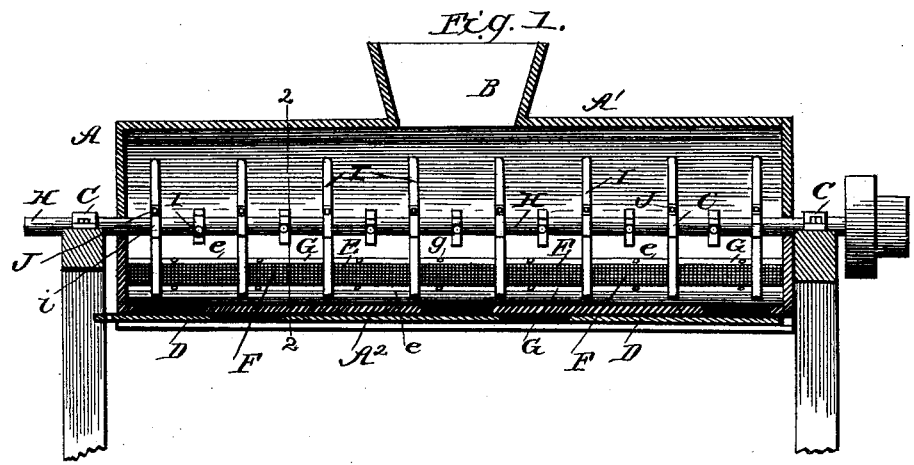
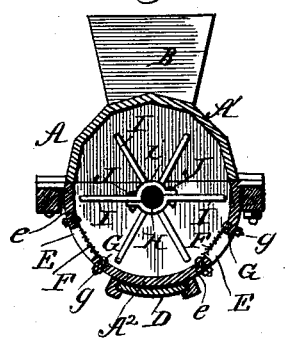
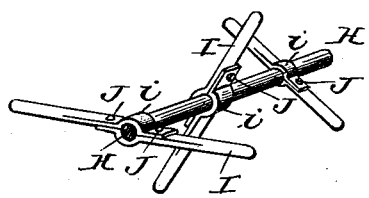
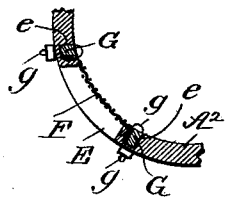
WITNESSES:
Fred G. Dieterich
P. B. Turpin
INVENTOR:
Squire A. Pickett.
BY
ATTORNEYS

UNITED STATES PATENT OFFICE.

SQUIRE A. PICKETT, OF CROWLEY, LOUISIANA.

RICE-SCOURER.

SPECIFICATION forming part of Letters Patent No. 482,192, dated September 6, 1892.

Application filed July 30, 1891. Serial No. 401,226. (No model.)

*To all whom it may concern:*

Be it known that I, SQUIRE A. PICKETT, of Crowley, in the parish of Acadia and State of Louisiana, have invented a new and useful Improvement in Rice-Scourers, of which the following is a specification.

My invention is an improved rice scourer and pounder; and the invention consists in certain constructions and combinations of parts, as will be hereinafter described, and pointed out in the claim.

In the drawings, Figure 1 is a vertical longitudinal section of the machine. Fig. 2 is a cross-section thereof. Fig. 3 is a detail view showing the shaft and a pair of beater-arms connected therewith, and Fig. 4 is a detail view illustrating the manner of securing the ventilating-gratings.

The casing A is preferably made in about the form shown, with the upper and lower section A' A², is provided centrally between its ends with the feed-hopper B, and has openings in its ends for the shaft H, which journals in the bearings C on the frame. This casing is supported on a suitable frame and has an outlet in its bottom, controlled by a gate D, the openings and gate being preferably made in the form of a damper, as shown. The gate may be moved longitudinally and set to close or open the outlet-openings in the casing.

In the lower half of the casing and on opposite sides of its central line I provide openings E, closed by gratings F, which may preferably be wire-netting secured in the manner shown. To this end the inner face of the casing surrounding the openings E is grooved or recessed at $e$, and the netting F is held at its edges in said grooves by means of strips G, of iron, fitted therein over the wire-netting and secured by bolts $g$, passed from the inside through the strips G and casing and secured outside the latter by means of nuts, as shown.

The shaft H is provided within the cylinder with the radial beaters I, which may be round or square in cross-section. When square, they are set to pass cornerwise through the rice or other grain.

I have shown the beaters as round at their outer or free ends and slightly flattened where they curve around the shaft and receive the fastening-bolts.

In securing the beaters to the shaft they are curved at their inner ends at $i$ to fit halfway around the shaft and are secured by bolts J J, two bolts being used for each pair of beaters. The pairs of beaters are arranged on the shaft about as shown in Fig. 2.

In operation the shaft is rapidly revolved, the rice or other grain being fed centrally to the casing. The wire-netting or grating furnishes ventilation to prevent the undue heating of the rice and also permits dust and the fine inner skin of the rice as it is scoured off to escape. When the rice has been properly scoured, the gate may be opened and the material withdrawn from the casing. By preference the casing is made with its top section in the six-sided or polygonal form shown, so as to prevent a rotating motion of the grain.

It will be seen that the beaters of each pair are arranged in alignment with each other and are curved near their inner ends to embrace the shaft, and their inner ends beyond said curved portions are arranged out of line with their outer or main portions. This is best shown in Fig. 2 and permits the arrangement of the main portions of the two beaters of a pair to be aligned, and at the same time enables the arrangement of the inner end of each beater alongside of the main portion of its mate, to which it is secured, as shown in Fig. 2 and 3.

Having thus described my invention, what I claim as new is—

In a machine substantially as described, the combination of the casing having an opening E and grooved or recessed at $e$ along the edges of said opening, the wire-netting fitted over the opening E and inserted at its edges in the groove or recess $e$, the strips fitted in the groove or recess, and the fastening-bolts for such strips, all substantially as and for the purposes set forth.

SQUIRE A. PICKETT.

Witnesses:
C. S. CRIPPEN,
P. B. LANG.